SYSTEM FOR DESIGNING MECHANICAL STRUCTURES

Filed Jan. 15, 1947 3 Sheets-Sheet 1

INVENTOR
EUGENE G. FUBINI
BY
Blair, Curtis & Hayward
ATTORNEYS

SYSTEM FOR DESIGNING MECHANICAL STRUCTURES
Filed Jan. 15, 1947
3 Sheets-Sheet 2
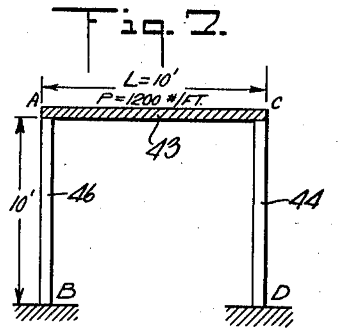
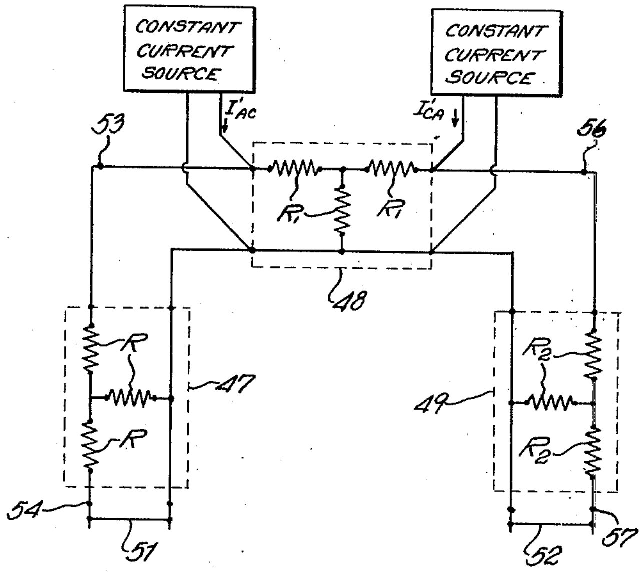
FIG. 8.
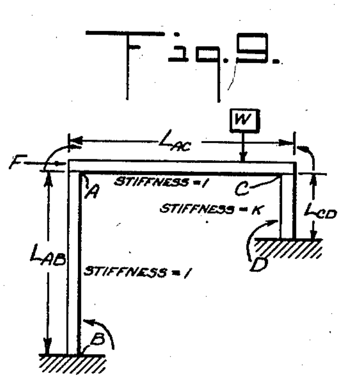
FIG. 10.
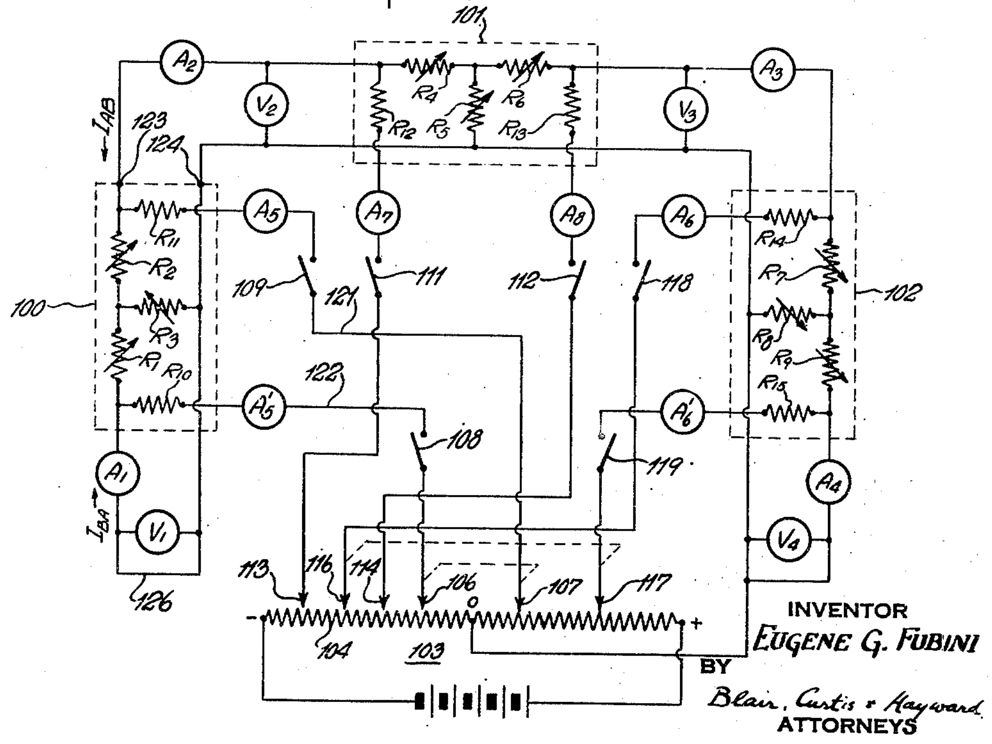
INVENTOR
EUGENE G. FUBINI
BY
Blair, Curtis & Hayward
ATTORNEYS INVENTOR
EUGENE G. FUBINI
BY
Blair, Curtis & Hayward
ATTORNEYS Patented June 24, 1952

2,601,382

UNITED STATES PATENT OFFICE 2,601,382

SYSTEM FOR DESIGNING MECHANICAL STRUCTURES

Eugene G. Fubini, Garden City, N. Y.

Application January 15, 1947, Serial No. 722,211

6 Claims. (Cl. 235—61)

Figure 1:
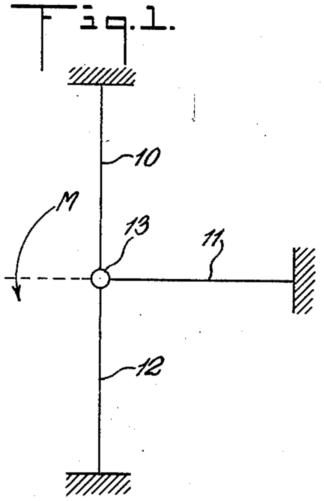

This invention relates generally to methods of and apparatus for rapidly and accurately solving specified problems and more particularly to methods and apparatus utilizing electrical circuits for the solution of problems associated with the design or analysis of mechanical structures.

Determination of moments, side sways, or other variables related to frame structures is ordinarily accomplished entirely by mathematical calculations, usually by methods of successive approximations which, in the case of relatively complicated structures, require lengthy and tedious computations. The solutions of these problems, therefore, involve considerable expense, are subject to the likelihood of human errors, and necessitate appreciable delay between the assignment of the problem and ascertainment of the solution.

In accordance with the present invention, methods and apparatus are provided for solving such problems in a small fraction of the time formerly required and substantially decreasing the likelihood of human errors and consequently reducing the expense involved in the solution of such problems.

Certain equations which express fundamental relationships between electrical quantities are closely analogous to equations involving parameters encountered in civil engineering problems. This invention provides the necessary methods and apparatus for establishing relationships or analogies between electrical quantities and variables associated with structural frames, thus permitting the electrical simulation of problems originally expressed in terms of civil engineering parameters, the determination by measurement of resulting electrical quantities, and the conversion of these values into the desired solutions of the civil engineering problems. The electrical apparatus may be so designed that, with the assistance of relatively simple instructions, a civil engineer having no specialized knowledge of electrical principles may readily utilize the apparatus to solve structural or other problems, thereby greatly increasing the utility of the invention.

Accordingly, it is an object of this invention to provide methods and apparatus whereby problems expressed as mechanical conditions or parameters may be solved by electrical methods.

A further object of this invention is to provide such methods and apparatus whereby civil engineering problems may be rapidly solved or corresponding structures designed by one conversant with the principles of civil engineering but not necessarily possessing unusual knowledge of the principles of electricity.

Still another object is to provide methods and apparatus for the determination, by electrical means, of parameters or conditions relating to frame structures.

The invention accordingly consists in the features of construction, combinations of elements, arrangements of parts, and methods of operation as will be exemplified in the structures and sequences and series of steps to be hereinafter indicated and the scope of the application of which will be set forth in the claims.

Figure 2:
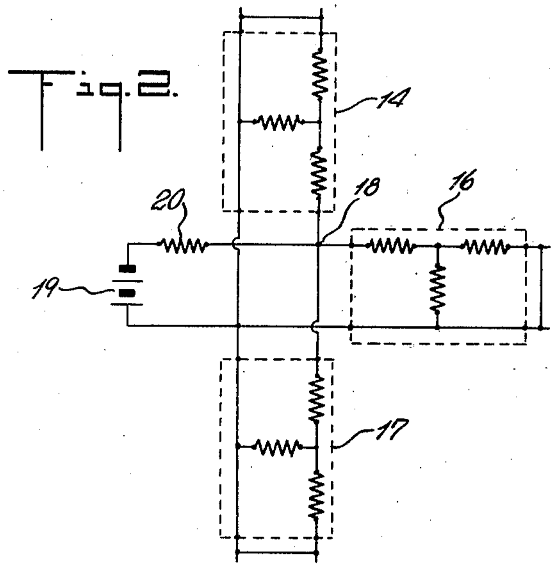
Figure 3:
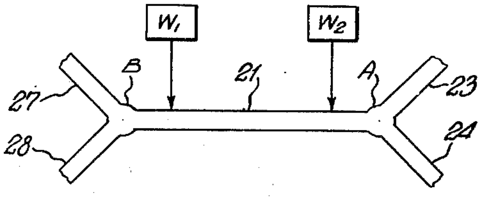
Figure 4:
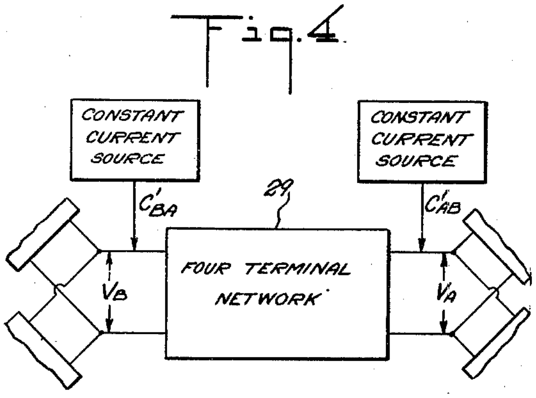
Figure 5:
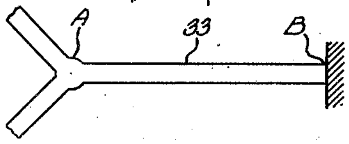
Figure 6:
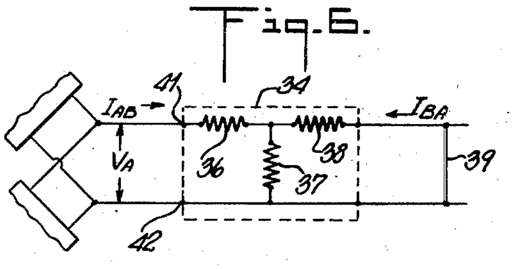
Figure 11:
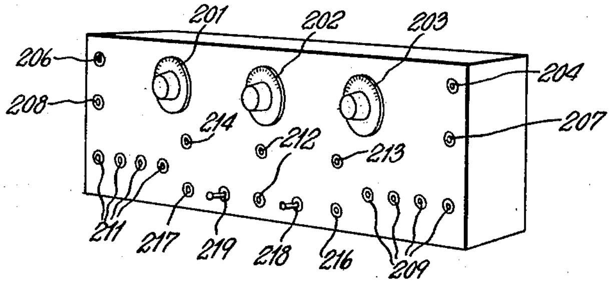
Figure 12:
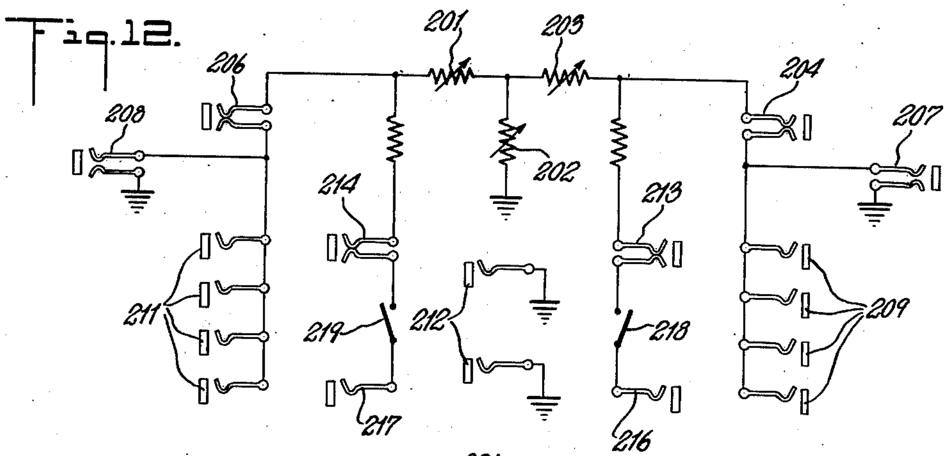
Figure 13:
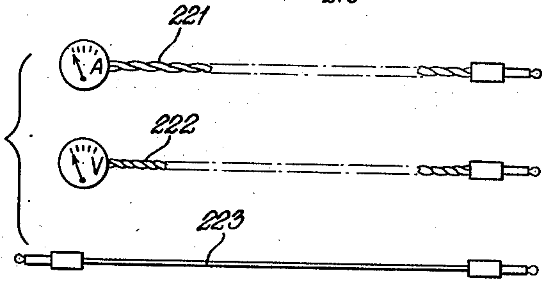
Figure 14:
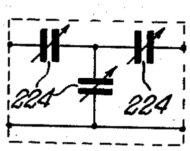
Figure 15:
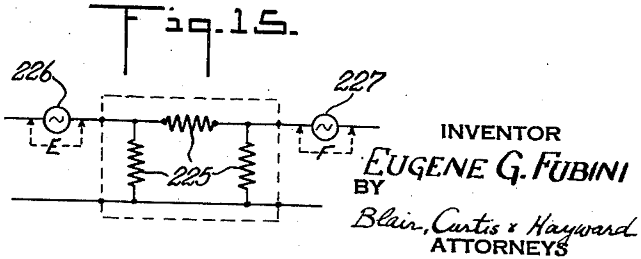

Other objects will be in part pointed out and in part apparent from the following description taken in conjunction with the attached drawings, in which:

Figure 1 represents a portion of frame structure,

Figure 2 is an electrical circuit equivalent to the structure shown in Figure 1, Figure 3 represents a portion of another frame structure, Figure 4 is an equivalent circuit of the structure shown in Figure 3, Figure 5 represents a beam having one end firmly clamped and the other end connected to the remaining portion of a frame structure, Figure 6 is an equivalent circuit of the beam shown in Figure 5, Figure 7 represents still another frame structure, Figure 8 is an electrical circuit analogous to the structure shown in Figure 7, Figure 9 is another and more complicated frame structure, Figure 10 represents, diagrammatically, the electrical apparatus for solving problems associated with the structure represented by Figure 9, Figure 11 shows one unit of an electrical apparatus, Figure 12 shows the electrical circuit of the apparatus of Figure 11, Figure 13 shows electrical components for use with apparatus of the type shown in Figure 11, Figure 14 shows a four-terminal electrical network including capacity elements, and Figure 15 shows a four-terminal network comprising resistive elements and two sources of constant voltage.

In this specification and the accompanying drawings, there is shown and described a preferred embodiment of this invention and various modifications thereof; but it is to be understood that these are not intended to be exhaustive nor limiting of the invention, but on the contrary are given for the purposes of illustration in order that others skilled in the art may fully understand the invention and the principles thereof and the manner of applying it in practical use so that they may modify and adapt it in various forms each as may be best suited to the conditions of a particular use.

Many mathematical expressions ordinarily used to denote principles involved in civil engineering problems may be shown to have the same general form as mathematical equations which represent principles pertaining to electrical circuits. For example, consider the analogy between the moments exerted about a rigid joint in a frame structure and the electrical current existing at the junction of two or more conductors in an electrical system.

Assume a number of structural beams or columns to be fastened at a rigid joint. In accordance with civil engineering principles the algebraic sum of the moments, M, exerted by the individual beams or columns is equal to zero:

$$\Sigma M=M_1+M_2+M_3 \ldots M_n=0 \qquad (1)$$

Moments exerted in one direction are considered to be positive and those exerted in the opposite direction are considered to be negative.

At the junction of a number of conductors in an electrical network the algebraic sum of the currents, I, entering and leaving the junction is equal to zero, where currents entering the network are said to be of opposite sign from those leaving it:

$$\Sigma I=I_1+I_2+I_3 \ldots I_n=0 \qquad (2)$$

The Equations 1 and 2 are seen to be of the same general form, thus indicating that under prescribed conditions we may consider a moment to be analogous to an electrical current.

When a moment is applied to a rigid joint, the joint is caused to rotate through a finite angle which depends for its magnitude upon the characteristics, for example stiffness, of the structural members connected to the joint. The joint being rigid as regards the several members in relation to each other, the ends of all members are necessarily caused to rotate the same amount by the applied moment.

Similarly, at a junction of several conductors in an electrical system the voltages existing between each of the conductors at the junction and a common reference point are necessarily equal in value. This indicates that under prescribed conditions, the angle of rotation of the members forming a rigid joint may be said to be analogous to the voltage existing at a junction of two or more electrical conductors.

To further illustrate the possibility of considering a current as the electrical counterpart of a mechanical moment and in addition to point out an analogy between the resistance of an electrical network and the stiffness of a structural element consider the simple frame structure shown in Figure 1. Three symmetrical structural elements 10, 11 and 12, form a rigid joint at 13 with the opposite end of each element firmly clamped. An external moment, M, is applied in the direction indicated by the arrow which tends to rotate joint 13 but is resisted by the moment exerted by structural elements 10, 11 and 12. At equilibrium joint 13 will have been rotated through a finite angle from its original position and the magnitude of this angle is a function of the stiffness of elements 10, 11 and 12. At equilibrium the individual moment exerted by any one of the structural elements under these conditions is a function of the stiffness of that element. If each of the elements has the same stiffness, each will exert the same moment about joint 13; then $$M_{10}=M_{11}=M_{12}=\frac{M}{3} \qquad (3)$$

In summary of the above, it may be said that under proper circumstances: (1) a current flowing through an electrical circuit element may be considered as analogous to a moment in a physical structure; (2) a voltage across an electrical element may be considered as analogous to a rotation in a physical structure; and (3) a resistance or impedance may be considered as analogous to the reciprocal of the stiffness in a physical structure.

An electrical circuit that may be considered analogous to the structure of Figure 1 is shown in Figure 2. Three four-terminal resistive networks, generally indicated at 14, 16, and 17, are connected at a common junction 18. A "four-terminal network" is a network of electrical elements having two pairs of terminals available for external connection and containing no sources of electrical energy, such as, batteries or generators, or the like. "Four-terminal networks" are well known in the electrical engineering field and are often referred to as "two terminal pair networks" or simply as "two terminal pairs." A discussion of the characteristics of four-terminal networks can be found in chapter IV of "Communication Networks," volume II by Professor Ernst A. Guillemin, 1st edition, 5th printing, John Wiley and Sons; these four-terminal networks are discussed beginning at page 448 in "Electric Circuits" by the Electrical Engineering Staff of M. I. T., 1st edition, 4th printing, John Wiley and Sons; see also pages 197 and 198 of "Radio Engineer's Handbook" by Professor F. E. Terman, 1st edition, 7th impression, McGraw-Hill. A source of voltage 19 is connected to the networks through a resistance 20 which may serve to make the source of voltage 19 act like a so called "constant-current" source as explained hereinafter. The current flow into each network will be an inverse function of the total input resistance of that network in a manner analogous to the structural example in which the moment exerted by the structural element is a direct function of the stiffness of that element.

Furthermore, if the input resistances of the networks 14, 16, and 17 are equal, the currents $I_{14}$, $I_{16}$, and $I_{17}$, into the respective networks will be equal. Thus, $$I_{14}=I_{16}=I_{17}=\frac{I}{3} \qquad (4)$$

A resistance may thus be considered, under prescribed conditions, as analogous to the reciprocal of the stiffness of an element in a mechanical structure.

In Figure 3 symmetrical beam 21 is connected at a rigid joint A to members 23 and 24 and at a second rigid joint B to members 27 and 28. Two loads, $W_1$ and $W_2$, are applied to beam 21 as shown.

The moments exerted by beam 21 about either end are expressed by the following civil engineering equations which neglect the effect of side sway:

$$M_{AB}=\xi(2\rho_A+\rho_B)+C_{AB} \qquad (5)$$

$$M_{BA}=\xi(2\rho_B+\rho_A)+C_{BA} \qquad (6)$$

where $M_{AB}$ is the moment exerted by beam 21 about the end A, $M_{BA}$ is the moment exerted by beam 21 about the end B, $\xi$ is the stiffness of beam 21 which for present purposes is assumed to be symmetrical and uniform, $\rho_A$ is the rotation of joint A upon loading, $\rho_B$ is the rotation of joint B upon loading, $C_{AB}$ is the fixed-end moment about the end A, $C_{BA}$ is the fixed-end moment about the end B, and a fixed-end moment is defined in accordance with civil engineering practice as the moment about the end of the beam when the two ends of the beam are securely clamped, with the beam subjected to the existing loads.

Figure 4 illustrates a four-terminal resistive network 29 having a voltage $V_A$ impressed across one set of terminals, a voltage $V_B$ impressed across the other pair of terminals, and two currents $C'_{AB}$ and $C'_{BA}$, of constant value impressed as shown.

The general equations for current flow into each end of the network are, with suitable sign conventions:

$$I_{AB}=\phi V_A+\beta V_B+C'_{AB} \qquad (7)$$

$$I_{BA}=\beta V_A+\delta V_B+C'_{BA} \qquad (8)$$

where $\phi$, $\beta$ and $\delta$ are constants depending upon the particular network. $C'_{AB}$ and $C'_{BA}$ represent the constant currents impressed on the networks as shown. These equations are of the same general type as Equations 5 and 6 and the moments about the ends of beam 21 (see Figure 3) are equivalent to the currents $I_{AB}$ and $I_{BA}$ into the respective ends of network 29 in Figure 4. The rotation of the joint A, $\rho_A$, is equivalent to the voltage $V_A$, and the rotation of joint B, $\rho_B$, is equivalent to the voltage $V_B$.

If we now set $\phi$ equal to $2\xi$, and $\beta$ equal to $\xi$, then the four-terminal network 29 may be considered perfectly analogous to beam 21.

Figure 5 illustrates a symmetric beam 33 fastened to joint A at one end and securely clamped at end B. If no load is applied, the fixed-end moments $C_{AB}$ and $C_{BA}$ are equal to zero. Figure 6 shows illustratively a network 34 which may be considered as the electrical equivalent of the beam 33. The network comprises resistances 36, 37, and 38, and has impressed upon it a voltage $V_A$. A condition of no load is assumed, therefore the fixed-end moments are zero and the equivalent circuit requires no source of constant current. The right-hand end of network 34 corresponds to end B of beam 33 and the left-hand end of the network corresponds to end A of the beam. End B of beam 33 is securely clamped and therefore no rotation is possible at that end. We have shown that rotation may be considered as analogous to voltage and therefore if the rotation is equal to zero there must be zero voltage between the corresponding terminals of the network: this condition is represented by the short circuit connection 39. Beam 33 is uniform and symmetrical and therefore the resistances 36, 37 and 38 have equal values.

Determining $I_{AB}$ from Equation 7 we have $$I_{AB}=\phi V_A+0 \qquad (9)$$

and from examination of electrical network 34

$$I_{AB}=\frac{2V_A}{3R} \qquad (10)$$

(where R is the value of each of the resistances 36, 37, and 38) and $$\phi V_A=\frac{2V_A}{3R} \qquad (11)$$

$$\phi=\frac{2}{3R} \qquad (12)$$

as specified above $\phi$ is equal to $2\xi$ therefore:

$$\xi=\frac{1}{3R} \qquad (13)$$

Therefore the network shown in Figure 6 is perfectly equivalent to beam 33 if the values of resistances 36, 37, and 38 are adjusted so that each resistance represents $$\frac{1}{3\xi}$$

The voltage measured between terminals 41 and 42 is equivalent to the rotation of joint A in Figure 5, the current $I_{AB}$ is equivalent to the moment exerted by beam 33 about joint A and the current $I_{BA}$ is equivalent to the moment exerted by beam 33 about point B.

Figure 7 illustrates a frame structure and Figure 8 an equivalent electrical network for determining, in accordance with the invention, the moments and, should occasion require, angles of rotation of the frame structure. A beam 43 is supported by columns 44 and 46. In Figure 8, network 47 represents column 46, network 48 represents beam 43 and network 49 represents column 44. It is to be noted that the networks are connected in a simple manner that is analogous to the physical position of the structural elements in Figure 7 and that the clamped ends of columns 46 and 44 are respectively represented by short circuit connections 51 and 52.

Illustratively, we shall determine the moments for beam 43 which carries a uniform load of 1200 pounds per linear foot. Because the structure and load are assumed to be symmetrical, consideration of side sway is not required. Beam 43 and columns 44 and 46 have equal and constant moments of inertia, and the load is applied only to beam 43.

The stiffness of a symmetrical and uniform beam is:

$$\text{Stiffness}=\frac{4\times\text{Moment of Inertia}}{\text{Length}}$$

Thus the stiffness factor takes into account the length of the structural element. Column 46 is represented by network 47 which is made up of three resistances having equal values, R, beam 43 is represented by network 48 which consists of three resistance elements each having a value equal to $R_1$, and column 44 is represented by a network 49 consisting of three resistors each having a value equal to $R_2$.

The stiffnesses and moments of inertia of the beam and columns are equal (span and height each being 10 feet) and the resistances may have any value (subject to certain practical limitations discussed below) provided they are all equal, and may be conveniently assumed to have a resistance of 1000 ohms each.

The fixed-end moments can be found in a standard handbook or in the case of the present example may be calculated from the equation:

$$FEM=\frac{PL^2}{12}$$

or $$C_{AC}=C_{CA}=\frac{1200\times 10^2}{12}=10{,}000\text{ foot-pounds}$$

The fixed-end moments are accounted for in the electrical circuit by a constant current $I'_{AC}$ applied to the left-hand end of network 48 and a constant current $I'_{CA}$ impressed on the right-hand terminals of the same network. A suitable source of constant current may be obtained from a constant voltage power source by placing a resistance in series with the supply which is sufficiently high relative to the internal resistance of the networks employed that the current is substantially constant regardless of changes in the network resistance.

Suitable values of current $I'_{AC}$ and $I'_{CA}$ are selected to correspond to the fixed-end moments. The most convenient value of current will depend upon the impedance of the network elements and the resistance of the meter used to indicate the currents. Assume a current of 100 milliamperes is impressed at each end of the network and therefore one milliampere of current will represent a moment of 100 foot-pounds.

A low impedance current measuring device is employed to measure the resulting current at point 53. The current indicated will be:

$$\frac{2}{3}I=\frac{2}{3}\times 100=66.67 \text{ m. a.}$$

which indicates the moment $M_{AB}$ and corresponds to a moment of 6,667 foot-pounds.

A similar current indicating device inserted at point 54 will indicate the moment $M_{BA}$ and will be equal to:

$$\frac{1}{3}I=\frac{1}{3}\times 100=33.33 \text{ m. a.}$$

$$M_{BA}=-3{,}333 \text{ foot-pounds}$$

The meter or other indicating device utilized to measure the current may be calibrated conveniently directly in terms of moments. The structure we have chosen to analyze is symmetrical and therefore the current measured at point 56 will be equal to that measured at 53 and the current measured at point 57 will be equal to that measured at 54. In the present example it has therefore been determined that:

$$M_{AB}=M_{CD}=6{,}667 \text{ foot-pounds}$$
$$M_{BA}=M_{DC}=-3{,}333 \text{ foot-pounds}$$

Figure 9 shows a frame structure selected as an example because the determination of the moments and side sway involves the principal operations present in the calculation of complicated frame structures. Settlement and side sway are similar and settlements may therefore be taken into account if desired in a way exactly parallel to the one used for side sway in the following example.

For the purposes of this determination, the moments about points A, B, C, and D are designated as positive if they are exerted in the directions shown by the arrows.

The horizontal displacement, $dA$ of joint A is designated as positive if it tends to move beam AC to the right and the horizontal displacement, $dC$ of the joint C is assumed to be positive if it tends to move beam AC to the left. Therefore:

$$dA=-dC$$

as is usually assumed in structural design. Each beam and column in Figure 9 is assumed to have a constant moment of inertia.

Figure 10 represents, illustratively, one form of apparatus suitable for electrically solving problems relating to the structure in Figure 9. Networks 100, 101 and 102 may be considered as individual units to be connected in the appropriate manner to electrically simulate the frame structure. Each network unit may conveniently be physically located relative to the other units in such manner that its position corresponds roughly to the position of the actual beam or column which the network represents. Such a procedure, although having no electrical effect, will assist an electrically inexperienced operator in properly connecting the networks. A power supply 103 supplies the necessary voltages for operating the networks. The apparatus also shows, illustratively, individual meters for measuring the electrical quantities at various places in the circuit. A commercial equipment advantageously provides connecting means, multipliers, and shunts to eliminate the multiplicity of meters. The networks are shown connected to simulate the frame structure of Figure 9. Network 100 corresponds to column AB, network 101 to beam AC, and network 102 to column CD. Each network includes three variable resistances connected in a T arrangement and illustratively those in networks 100 and 101 are each adjusted to have a resistance of 1000 ohms and those in network 102 to have a resistance equal to $$\frac{1000}{K}$$

where K is stiffness of column CD relative to the stiffness of element AB whose stiffness is represented by unity.

An adjustable source of voltage is represented by the tapped resistance 104. The center point of the resistance serves as a reference and is connected to the common side of all the networks. Voltages either positive or negative in respect to the center point may be obtained by adjustment of the taps.

The power supply is made to serve as a source of constant current by inserting in series with each positive or negative lead a resistance of sufficiently high value that changes in the network resistances will have a negligible effect on the current. A typical value is 100,000 ohms. These resistances are denoted $R_{10}$, $R_{11}$, $R_{12}$, $R_{13}$, $R_{14}$, and $R_{15}$ in Figure 10. The resistances used in the T networks may be any convenient value so long as they maintain the proper relationship to each other and are low compared to the constant current resistances and high as compared to the resistance of the meter or other indicator used to measure the currents in the circuits. Network 100 is connected to taps 106 and 107 through switches 108 and 109 respectively. Network 101 is connected through switches 111 and 112 to taps 113 and 114 respectively. Network 102 is connected to taps 116 and 117 through switches 118 and 119 respectively.

Because columns AB and CD are uniform and symmetrically loaded the taps 106 and 107 and taps 116 and 117 may be ganged in such manner that as one of the ganged taps moves away from the zero point the associated tap moves a corresponding distance in the opposite direction. It is thus necessary to adjust only one of the taps 106 or 107 and one of the taps 116 or 117.

The terminals of two resistor networks are connected together to indicate that two corresponding structural elements are joined or a particular network is short-circuited to indicate that the corresponding end of the structural element is clamped.

Any low resistance indicator may be used to measure the current at the desired points. For most applications a low resistance milliameter is suitable and may conveniently be calibrated in units of moments. For more elaborate systems requiring extreme accuracy measuring means employing electronic amplifiers may be employed.

The following equivalences may be said to exist between the individual structural elements and the corresponding electrical quantities. Consider first the network 100 as equivalent to column AB. The stiffness, $\xi$, is equal to unity and the equivalent resistances $R_1$, $R_2$, and $R_3$, each have a value of 1000 ohms. No equivalent of length is necessary as this factor is included in the stiffness. The moment about A, $M_{AB}$, is considered positive in a clockwise direction and its electrical equivalent, current $I_{AB}$, is considered positive when the direction of current flow is into the network. The moment about B, $M_{BA}$, is considered positive in a counter-clockwise direction and its electrical equivalent, current $I_{BA}$, is considered positive when the direction of current flow is into the network. Horizonal displacement of A, $dA$, is considered positive if it acts in a clockwise direction as seen from B. The fixed-end moments caused by side sway $dA$ are equivalent to the currents impressed on the network through resistances $R_{10}$, and $R_{11}$. The side sway, $S_{AB}$, is equal to $$-\xi_{AB}\frac{dA}{L_{AB}}$$

and the electrical equivalent is the current in lead 121. The current in lead 122 is equivalent to the side sway, $S_{BA}$, which is equal to $$\xi_{AB}\frac{dA}{L_{AB}}$$

The currents in leads 121 and 122 are equal and of opposite sign. Their value is an unknown of the problem and both currents are considered positive when the direction of current flow is out of the network. The sign conventions for $S_{AB}$ and $S_{BA}$ are the same as for $M_{AB}$ and $M_{BA}$. The voltage between terminals 123 and 124 is equivalent to the angle of rotation of joint A. The rotation is considered positive if clockwise. The angle of rotation at B is equal to zero and is electrically represented by the short circuit at 126. The conversion factor from unit of voltage to unit of angle of rotation is determined by the choice of the relation between stiffness and resistance and between moment and current.

Similar relationships are true for column CD and network 102. The stiffness, $\xi$, in this case is equal to K and the resistances $R_7$, $R_8$, and $R_9$ are each equal to $$\frac{1000}{K}$$

The moment about C, $M_{CD}$, is considered positive if counterclockwise and the moment about D, $M_{DC}$, is considered positive if in a clockwise direction. The horizontal displacement of joint C, $dC$, is considered positive if it acts in a counterclockwise direction as seen from D. The angle of rotation of joint C is considered positive in a counterclockwise direction.

Similar relationships are also true regarding beam AC and network 101. The stiffness $\xi$ is equal to unity and the resistances $R_4$, $R_5$, $R_6$, in network 101 each have a value of 100 ohms. The fixed-end moment $C_{AC}$ is considered positive if clockwise and moment $C_{CA}$ is considered positive if counterclockwise; both moments are created by the load W on the beam. These moments correspond to the currents impressed on the network through resistors $R_{12}$ and $R_{13}$. Their value is assigned by the problem and they are considered positive when leaving the network.

The fixed-end moments caused by side sway are assigned arbitrary values which are corrected in the final result to the proper values. These assumed fixed-end moments $S_{CD}$ and $S_{CD}$ ($S_{CD}=-S_{DC}$) are related to $S_{AB}$ and $S_{BA}$ ($S_{AB}=-S_{BA}$) by the fact that $dA=-dC$ hence:

$$S_{CD}=-S_{DC}=-\xi_{CD}\frac{dC}{L_{CD}}=\xi_{CD}\frac{dA}{L_{CD}}$$

$$S_{AB}=-S_{BA}=\xi_{AB}\frac{dA}{L_{AB}}$$

$$\frac{S_{CD}}{S_{AB}}=\frac{\xi_{CD}\frac{dA}{L_{CD}}}{\xi_{AB}\frac{dA}{L_{AB}}}$$

Thus even though we are not aware of the absolute values of $S_{AB}$ and $S_{CD}$ ($dA$ and $-dC$ not determined), the ratio is known:

$$\frac{S_{CD}}{S_{AB}}=\lambda\frac{L_{AB}}{L_{CD}}$$

(where $\lambda$ is a constant depending on relative stiffness) and, denoting the ratio of the length of column AB to the length of column CD, by $h$:

$$\frac{S_{CD}}{S_{AB}}=\lambda h$$

The series of steps involved in operating the apparatus shown in Figure 10 is set out in detail below:

Switches 111 and 112 are closed to apply current to network 101 which corresponds to beam AC. Taps 113 and 114 are adjusted so that the currents read by meters $A_7$ and $A_8$ correspond respectively to the assigned fixed-end moments $C_{AC}$ and $C_{CA}$. The sign is determined by the rules given above and are both assumed to be positive. The value of the current is determined but the relation factor between moments and currents remain arbitrary. Only the ratios between moments enter into the calculation, not their absolute values.

With all switches except 111 and 112 open, read the currents on meters $A_1$, $A_2$, $A_3$, and $A_4$, and the voltages on meters $V_2$, and $V_3$. Let these values be recorded as $A_1$, $A_2$, $A_3$, $A_4$, $V_2$ and $V_3$ with the signs observed according to the conventions detailed herein.

Open switches 111 and 112 and close switches 108, 109, 118 and 119 to apply currents to networks 100 and 102. Set the corresponding taps in the power supply until the currents indicated by meters $A_5$ and $A_6$ are equivalent to "1" and $h\lambda$ respectively.

Read again the currents indicated by meters $A_1$, $A_2$, $A_3$, and $A_4$ and the voltages indicated by meters $V_2$ and $V_3$. Let these values be recorded as $A_1'$, $A_2'$, $A_3'$, $A_4'$, $V_2'$, and $V_3'$ and observe signs as before.

It can now be written that:

$$I_{AB}=A_1+\chi A_1' \qquad I_{CD}=-(A_3+\chi A_3')$$
$$I_{BA}=A_2+\chi A_2' \qquad I_{DC}=-(A_4+\chi A_4')$$
$$I_{AC}=-(A_2+\chi A_2') \qquad V_A=V_2+\chi V_2'$$
$$I_{CA}=A_3+\chi A_3' \qquad V_C=V_3+\chi V_3'$$

$\chi$ is unknown and may be determined, for example, by the condition that the shear balances the external force, F. The shear with the adopted sign conventions (Figure 10) is $$\frac{M_{AB}-M_{BA}}{L_{AB}}+\frac{-M_{CD}+M_{DC}}{L_{CD}}=F$$

where F is the external force indicated in Figure 9.

If the meters are not calibrated directly, the unknown factor "$\chi$" can be found in electrical terms, $$h=\frac{L_{AB}}{L_{CD}}$$

and the equation can be written $$M_{AB}-M_{BA}-hM_{CD}+hM_{DC}=F\cdot L_{AB}=M$$

Using a suitable scale factor between moments and currents, the current I equivalent to M is determined, therefore:

$$I_{AB}-I_{BA}-h(I_{CD}-I_{DC})=I$$

and substituting:

$$I=A_1-A_2+h(A_3-A_4)+\chi[A_1'-A_2'+h(A_3'-A_4')]$$

$$\chi=\frac{I-[A_1-A_2+h(A_3-A_4)]}{A_1^1-A_2^1+h(A_3^1-A_4^1)}$$

With the value of $\chi$ thus determined, the values of the unknown voltages and currents are immediately determined. The currents thus determined are multiplied by the already established proportional factor to give the desired corresponding moments.

In order to simplify the explanation of the underlying principles of operation of the invention, we have considered symmetrical structures comprised of uniform beams. However, for those occasions when the structural elements must be considered as asymmetric units, the values of the resistances $R_1$, $R_2$, and $R_3$ making up an electrical network such as that shown at 100 in Figure 10 will have different values. There exists a definite relationship between the carry-over-factor and stiffness and the resistance values thereby enabling such problems to be readily solved. The carry-over-factors and stiffnesses are readily available in standard civil engineering handbooks and the resulting values of R can then be chosen to satisfy the following equations:

$$\text{C. O. F.}_{\text{left}}=\frac{R_3}{R_2+R_3}$$

$$\text{C. O. F.}_{\text{right}}=\frac{R_3}{R_1+R_3}$$

$$\text{Stiffness}_{\text{left}}=\frac{R_2+R_3}{R_1R_2+R_1R_3+R_2R_3}$$

$$\text{Stiffness}_{\text{right}}=\frac{R_1+R_3}{R_1R_2+R_1R_3+R_2R_3}$$

Thus the values of $R_1$, $R_2$, and $R_3$ may be determined readily without extensive calculations and the problem electrically solved as described herein.

Figure 11 represents the front panel of one of the network units. Each element in the structure to be analyzed is represented by one of these network units and the entire structure is represented by several units connected together in accordance with the particular structure to be analyzed as described above. Controls 201, 202, and 203 regulate the values of the elements in the network and are calibrated accordingly. Jacks 204 and 206 are provided for determining the current into or out of the network by means of a "plug-in" meter. Jacks 207 and 208 are provided to permit determination of the voltage existing across the terminals of the network. Jacks 209 are connected in parallel with each other, as are jacks 211, and are provided to permit convenient interconnection between the electrical networks. Jacks 212 are provided for connecting together the common terminals of all networks. Two additional jacks 213 and 214 are provided for measuring the currents delivered by the constant current sources and jacks 216 and 217 are provided for connecting the current sources to the network. Switches 218 and 219 provide a convenient means of interrupting the circuit between the network and the constant current supply.

Figure 12 is the schematic circuit of the network employed in the unit shown in Figure 11 and the components are correspondingly numbered.

Figure 13 illustrates a plug-in type milliameter 221, a plug-in type voltmeter 222, and an interconnecting cable 223 for use with network units such as that shown in Figure 11.

Many modifications of the above invention will be readily apparent, for example, the system could be operated by alternating current and a phase detecting device such as an oscilloscope utilized to determine whether the instantaneous direction of current flow is into or out of a particular network. Other elements may readily be substituted for the variable resistances in the network and Figure 14 shows a network comprising three variable capacitances 224 suitable for use in an alternating current system. The impedance of the condensers at the particular frequency being used would then be adjusted as a function of the stiffnesses of the structural elements.

Other effective four-terminal networks may, of course, be substituted for the "T" arrangement shown. Figure 15 shows a network having three resistors in a "pi" arrangement. The values of the elements comprising these and other networks may be readily obtained from the general equations given above or by well known electrical relationships between such networks.

Other modifications may be made in order to provide a more desirable product for certain commercial applications. For example, a source of constant voltage can be substituted for the constant current supplied to the network in the above embodiment, and has particular advantage where alternating current operation is desired. In Figure 15 two constant voltage generators, 226 and 227, which may advantageously comprise low impedance transformer windings, are shown in series with the network leads.

The general Equations 7 and 8 above would, of course, be replaced by suitable equations and the subsequent operations performed accordingly. The following general equations, take into account the constant voltage generators 226 and 227, where E is the voltage across the terminals of generator 226 and F is the voltage across the terminals of generator 227 and the remaining symbols have the same meaning as in Equations 7 and 8.

$$I_{AB}=\phi(V_A+E)+\beta V_B$$
$$I_{BA}=\beta V_A+\delta(V_B+F)$$

$\phi E$ corresponds to the constant current $C^1_{AB}$ and $\delta F$ corresponds to the constant current $C^1_{BA}$.

Apparatus constructed in accordance with the principles described herein is particularly advantageous in solving problems mathematically difficult of solution, for example, those involving arches or moving loads or when it is desired to analyze or design only part of an entire structure.

Still other modifications may be readily made to increase the practicability of the system for commercial applications. For example, the mathematical calculations indicated above in the electrical solution of the problem relating to the structure and apparatus shown in Figures 9 and 10 can be avoided by connecting currents $I_{AB}$ and $hI_{DC}$ ($I_{DC}$ with shunt) to one series of windings of a differential ammeter and $I_{BA}$ and $hI_{CD}$ to the other series of meter windings and adjusting the position of taps 116, 117, 106 and 107 until the meter indicates the desired value for I.

From the foregoing it will be observed that the electrical networks embodying this invention are well adapted to attain the ends and objects hereinbefore set forth and to be economically manufactured, since the separate units are well suited to common production methods and are subject to a variety of modifications as may be desirable in adapting the invention to different applications.

From the above, it is apparent that many possible embodiments may be made of the above invention and as many changes might be made in the embodiment above set forth, and therefore it is to be understood that all matter hereinbefore set forth or shown in accompanying drawings is to be interpreted as illustrative and not in a limited sense.

I claim:

1. A system for analyzing frame structures including a plurality of electrical networks, each having at least three relatively adjustable qualitatively similar impedance elements, each of said networks corresponding to a particular member of the structure to be analyzed; detachable electrical connecting means for joining said networks to correspond to the arrangement of members in said structure; a source of electrical energy for supplying independently adjustable electrical quantities to each of said networks, said quantities being substantially independent of circuit changes within said networks and adapted to be individually adjusted in accordance with structural parameters affecting the corresponding structural member; and an indicator for measuring an electrical quantity associated with each network to thereby denote movements or moments affecting each corresponding structural member.

2. A system for solving problems relating to frame structures including a plurality of electrical networks, each having at least three relatively adjustable resistance elements, each of said networks corresponding to a particular member of the structure to be analyzed and said resistance elements being adapted to be adjusted in accordance with a predetermined relationship between electrical resistance and mechanical stiffness or carry-over factors of the particular structural member to which the particular network corresponds; detachable electrical connecting means for joining said networks in accordance with the arrangement of members in said structure; an adjustable source of electric current associated with each of said networks, said current being substantially independent of circuit changes within said networks and adapted to be individually adjusted in accordance with moments affecting the particular member to which the network corresponds and in accordance with a predetermined relationship between moments and currents; and an indicator for measuring resulting electric currents associated with each network to thereby denote moments affecting each corresponding member.

3. A system for solving problems relating to frame structures including a plurality of electrical networks, each having at least three relatively adjustable resistance elements, each of said networks corresponding to a particular member of the structure to be analyzed and said resistance elements being adapted to be adjusted in accordance with a predetermined relationship between electrical resistance and mechanical stiffness or carry-over factors of the particular structural member to which the particular network corresponds; detachable electrical connecting means for joining said networks in accordance with the arrangement of members in said structure; an adjustable source of electric voltage associated with each of said networks, said voltage being substantially independent of circuit changes within said networks and adapted to be individually adjusted in accordance with moments affecting the particular member to which the network corresponds and in accordance with a predetermined relationship between moments and currents; and an indicator for measuring resulting electric currents associated with each network to thereby denote moments affecting each corresponding member.

4. A system for solving problems relating to the effects of stress upon mechanical structures, said system including: a plurality of four terminal electrical networks each having at least three relatively adjustable resistance elements, each of said networks corresponding to a particular member of the structure to be analyzed, said resistance elements being adapted to be individually adjusted in accordance with a predetermined relationship between electrical resistance and the structural characteristics of the particular structural member to which the particular four-terminal network corresponds; detachable electrical connecting means for electrically interconnecting said four-terminal networks in a composite network electrically corresponding to the said mechanical structure in its unstressed state; a source of electrical energy for supplying independently adjustable electrical quantities to each of said four-terminal networks, said quantities being substantially independent of circuit changes within said composite network and adapted to be individually adjusted in accordance with predetermined reationships between the electrical quantities supplied to each of said four-terminal networks and the stresses affecting the particular structural members to which each of said four-terminal networks correspond; and an indicator having electrical connecting means for connecting said indicator to measure an electrical quantity associated with each of said four-terminal networks thereby to determine the effects resulting to the corresponding members of said mechanical structure caused by the stress or stresses applied thereto.

5. In a system for analyzing frame structures having a plurality of interconnected structural members, apparatus comprising a plurality of four-terminal networks each including three adjustable resistance elements, means for connecting said networks together to simulate said structural members, constant-current supply means arranged to supply a plurality of currents of different values and including means for varying the relative values of said currents, means for connecting said currents from said constant current supply means to respective junctions of said networks, and means for measuring the voltages existing at the junctions of said networks.

6. In a system for analyzing frame structures having a plurality of interconnected structural members, apparatus comprising a plurality of four-terminal networks each including three adjustable resistance elements, means for connecting said networks together to simulate said structural members, constant-current supply means arranged to supply a plurality of currents of different values and including means for varying the relative values of said currents, means for connecting said currents from said constant current supply means to respective junctions of said networks, and means for measuring the currents flowing between said networks.

EUGENE G. FUBINI.

REFERENCES CITED

The following references are of record in the file of this patent:

UNITED STATES PATENTS

| Number | Name | Date |
|---|---|---|
| 2,087,667 | Hedin | July 20, 1937 |

OTHER REFERENCES

"Structural Analysis by Electric Circuit Analogies," from The Journal of the Franklin Institute, vol. 217, No. 3, March 1934.

"Network Analyzer Solution of the Equivalent Circuits for Elastic Structures," from The Journal of the Franklin Institute, December 1944.